United States Patent Office 2,976,167
Patented Mar. 21, 1961

---

2,976,167

PROCESS FOR IMPROVING FIBROUS MATERIAL AND COMPOSITION THEREFOR

Arthur Maeder, Basel, Theodor Weber, Neuewelt, near Basel, Georg Sulzer, Basel, Willy Fatzer, Bottmingen, and Peter Guertler, Basel, Switzerland, assignors to Ciba Limited, Basel, Switzerland No Drawing. Filed July 9, 1956, Ser. No. 596,393

Claims priority, application Switzerland Aug. 17, 1955

21 Claims. (Cl. 117—33)

It is known to use latices of polymerization plastics for dressing fibrous materials, and these polymerization plastics may be used in combination with hardenable aldehyde condensation products.

The present invention provides a process for treating fibrous materials, wherein there is applied to the fibrous material an aqueous preparation which contains the following components:

(a) A latex of a polymerization plastic, (b) An aqueous dispersion of a water-insoluble derivative, which is soluble in organic solvents, of a condensation product of formaldehyde with an amino-compound capable of forming a hardenable resin with formaldehyde, and (c) A water-soluble condensation product of formaldehyde with an amino-compound capable of forming a hardenable resin with formaldehyde, or a derivative of such condensation product, and the treated material is dried and heated to harden the composition applied.

As components (a) there may be used practically any flexible and elastic polymerization plastic in latex form. Especially advantageous are those polymerization plastics which contain groups capable of causing cross-linking with the components (b) and (c). The polymerization products may be homopolymers or copolymers. They are advantageously derived from monomeric compounds containing the atomic grouping

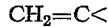

for example, vinyl esters of organic acids, such as vinyl acetate, vinyl formate, vinyl butyrate, vinyl benzoate, and also vinyl alkyl ketones, vinyl halides such as vinyl chloride, vinyl fluoride, vinylidene chloride, vinyl-aryl compounds such as styrene and substituted styrenes, and also compounds of the acrylic acid and methacrylic acid series, such as esters of acrylic acid with alcohols or phenols, for example, ethyl acrylate, butyl acrylate, dodecyl acrylate. Other monomeric compounds, which may be used for making the polymers, are acrylonitrile, acrylic acid amide and its derivatives substituted at the amide nitrogen atom, and also analogous derivatives of methacrylic acid, α-chloracrylic acid, crotonic acid, maleic acid or fumaric acid, and also acrylic acid and methacrylic acid themselves, and finally polymerizable olefines, such as isobutylene, butadiene, 2-chlorobutadiene, or heterocyclic compounds such as the various vinylpyridines. Methods for preparing binary, ternary or more complicated copolymers in emulsion form are known, so that these methods need not be described. The following are a few suitable co-polymers:

(1) A copolymer of 50 parts of n-butyl acrylate, 40 parts of vinyl chloride and 6 parts of acrylic acid.
(2) A copolymer of 66 parts of n-butyl acrylate, 12 parts of styrene and 22 parts of vinyl isobutyl ether.
(3) A copolymer of 64 parts of ethyl acrylate, 12 parts of styrene, 22 parts of vinyl isobutyl ether and 2 parts of acrylic acid.
(4) A copolymer of 70 parts of asymmetrical dichlorethylene and 30 parts of butyl acrylate.
(5) A copolymer of 56 parts of butyl acrylate, 40 parts of vinyl chloride and 4 parts of acrylic acid.
(6) A copolymer of 50 parts of asymmetrical dichlorethylene, 45 parts of butyl acrylate and 5 parts of acrylic acid amide.
(7) A copolymer of 52 parts of vinyl chloride, 35 parts of butyl acrylate, 7 parts of methyl acrylate and 6 parts of acrylic acid amide.

There may also be used the ordinary commercial copolymers of styrene and butadiene and those of acrylonitrile and butadiene.

The water-insoluble derivatives, which are soluble in organic solvents, of condensation products of formaldehyde with an amino-compound capable of forming a hardenable resin with formaldehyde, and used as component (b), are also used in the form of a dispersion. These derivatives may be derived, on the one hand, from condensation products of formaldehyde with urea, thiourea, guanidine, acetylenediurea, dicyandiamide or uron, and also aminotriazines such as melamine or guanamines such as acetoguanamine, benzoguanamine or formoguanamine, and, on the other, from alcohols, immiscible with water, such as butyl alcohol, amyl alcohol, hexyl alcohol, cyclohexanol, benzyl alcohol, dodecyl alcohol, oleyl alcohol or abiethyl alcohol. In addition to ether radicals the condensation products may also contain radicals of acids of high molecular weight, for example, stearic acid. When acid radicals of high molecular weight are present, the compounds may also be derived from methylol ethers of water-soluble alcohols of low molecular weight. Methods for making such condensation products are known. The aqueous dispersions can also be prepared by methods in themselves known with the use of emulsifying agents or protective colloids, such as casein or gelatine. Also very suitable are ethylene oxide condensation products of alcohols, acids or amines of high molecular weight, for example, of oleyl alcohol, octadecyl alcohol or hydroabiethyl alcohol. For preparing the dispersions it may be of advantage to remove from the condensation products the solvent which remained behind after the production of the condensation products.

The water-soluble formaldehyde condensation products to be used as components (c) may be derived from the amino-compounds mentioned under (b). Instead of the free methylol-compounds, there may be used their watersoluble ethers with lower alcohols, such as methanol or ethanol.

Components (a), (b) and (c) used for making the preparations need not contain only one compound of the kind in question but may contain several such compounds. The relative proportions of the components may vary within fairly wide limits. For example, with 100 parts of component (a) there may be used 1 to 150 parts of component (b) and 5 to 100 parts of component (c). However, it is preferable to use a quantity of component (a) which is approximately equal to the quantity of components (b) and (c) together. A very advantageous ratio is, for example, 100 parts of component (a), 50 parts of component (b) and 15 to 40 parts of component (c). The quantities referred to above are calculated on the dry content of the components.

Preparations can be made which contain two or three of the components, and are suitable for storage. For this purpose, however, any acid groups present in component (a) must be neutralized. This is not necessary if the preparation is to be used immediately. It is also of advantage to add hardening catalysts when the preparations are to be used, such as acids or compounds which liberate an acid when heated, for example, ammonium salts of strong acids. Hardening is carried out under the usual conditions, for example, at 120–160° C. for 2 to 10 minutes. The preparation may be applied to the fibrous materials by known methods, for example, by impregnation, coating or printing. If desired, the preparations may be thickened with the usual thickening agents, such as alginates or tragacanth. They may also contain fillers or pigments. The preparations of the invention are suitable for producing various kinds of impregnations and dressings, for example, as binding agents in pigment printing. Especially suitable are they as adhesives for flock printing and as binding agents in dyeing with pigments.

The fibrous materials to be treated by the process of the invention are more especially fabrics of natural or regenerated cellulose, such as cotton, linen, artificial silk or staple fibers of regenerated cellulose, and also cellulose esters such as cellulose acetate artificial silk, animal fibers like wool and silk or synthetic fibrous materials such as nylon, polyester fibers or polyacrylonitrile fibers.

The following examples illustrate the invention, the parts and percentages being by weight unless otherwise stated and the relationship of parts by weight to parts by volume being the same as that of the kilogram to the liter:

EXAMPLE 1

680 parts of a copolymer latex from 80 parts of isobutyl acrylate, 10 parts of acrylonitrile and 10 parts of acrylic acid amide and having a dry content of 40 percent, are cautiously mixed with 340 parts of an aqueous emulsion of 50 percent strength of a methylol-melamine butyl ether emulsified with a condensation product of 1 mol of hydroabiethyl alcohol with about 200 mols of ethylene oxide with the addition of 1.3 parts of a solution of equal parts of triethylamine, isopropanol and water, and the mixing is carried out in a homogenizing machine. The mixture has a pH value of 7.5 to 8.

In order to prepare an adhesive paste for flock printing, 58 parts of the above preparation are mixed with 4 parts of trimethylol-melamine trimethyl ether, 32 parts of alginate thickening 40:1000, and also 2 parts of a silicone anti-foaming agent, 4 parts of an aqueous solution of ammonium chloride of 25 percent strength, making a total of 100 parts. A cotton fabric is coated with the resulting mixture, then it is flocked, dried and heated for 5 minutes at 120° C. There is obtained a flock print which is very fast to washing, and does not come off after being boiled with soap solution for ½ hour and scoured 40 times.

EXAMPLE 2

400 parts of a copolymer latex prepared from 70 parts of isobutyl acrylate, 23 parts of acrylonitrile, 5 parts of acrylic acid amide and 2 parts of acrylic acid, and having a dry content of 40 percent, are neutralized by stirring in 3.3 parts of triethanolamine, whereupon the emulsion increases slightly in viscosity. 200 parts of an aqueous emulsion of 50 percent strength of the methylol-melamine butyl ether used in Example 1 are then mixed with the former emulsion in a homogenizing machine. The mixture has a pH value of 7.2 to 7.5.

In the procedure described in Example 1, 58 parts of the preparation described in the preceding paragraph are used, instead of 58 parts of the preparation described in that example, for preparing an adhesive paste for flock printing, and a flock print is fixed on cotton fabric in the same manner. There is produced a flock print, which is fast to washing, fast to wet scouring and resistant to dry cleaning with trichlorethylene.

EXAMPLE 3

400 parts of a copolymer latex prepared from 85.8 parts of isobutyl acrylate, 9.6 parts of acrylonitrile and 4.6 parts of acrylic acid are neutralized with 10 parts of triethanolamine, and mixed with 200 parts of an emulsion of 50 percent strength of methylol-melamine butyl ether. The mixture has a pH value of 7.5 to 8.0.

In order to prepare an adhesive paste, which can be used with advantage for flock printing on textiles, 50 parts of the above mixture are mixed with
4 parts of trimethylol-melamine trimethyl ether, and
40 parts of alkinate thickening, 40:1000,
2 parts of an anti-foaming agent, and
4 parts of an aqueous solution of ammonium chloride of 25 percent strength are added 100 parts After being heated for 5 minutes at 120° C., a flock print produced with the above paste is fast to washing and wet scouring and withstands dry cleaning with trichlorethylene.

A mixture prepared in the same manner as the above adhesive paste, except that the emulsion of methylol-melamine butyl ether was omitted, when used in the same manner does not yield a flock print which is fast to wet scouring and dry cleaning with trichlorethylene.

EXAMPLE 4

400 parts of a copolymer latex prepared from 48.2 parts of n-butyl acrylate, 49.8 parts of vinyl acetate and 2 parts of acrylic acid are cautiously neutralized by stirring in about 13.6 parts of a mixture of 20 parts of an aqueous solution of ammonia of 20 percent strength and 80 parts of ethylene glycol monoethyl ether. The latex is then mixed, preferably in a homogenizing machine, with 200 parts of an aqueous emulsion of 50 percent strength of a methylol-melamine butyl ether, and 4.4 parts of triethanolamine are added to the mixture, which then has a pH value of 7.2 to 7.6.

A spreadable binding agent suitable for flock printing is obtained by mixing 58 parts of the preparation described above with
9 parts of trimethylol-melamine trimethyl ether,
27 parts of alginate thickening 40:1000,
2 parts of an anti-foaming agent, and
4 parts of an aqueous solution of ammonium chloride of 25 percent strength 100 parts A cotton fabric is coated with the above mixture, then flocked, dried in the usual manner and hardened for 5 minutes at 120° C. The resulting flock print is fast to washing.

A binding agent prepared in the same manner, but without the addition of the emulsion of methylol-melamine butyl ether, when applied in the same manner yields a flock-coating which is distinctly inferior in its fastness to washing.

EXAMPLE 5

A dyebath is prepared which contains, per liter, 15 grams of the copolymer latex described in Example 3 in a non-neutralized form, 15 grams of an emulsion of 70 percent strength of a methylol-melamine allyl ether modified with soya bean fatty acid, Turkey red oil being used as emulsifying agent, 50 grams of a water-soluble methyl ether of a urea-formaldehyde condensation product containing more than 2 mols of condensed formaldehyde per mol of urea, 5 grams of a micro-dispersed dyestuff paste of the red dyeing vat dyestuff of the formula

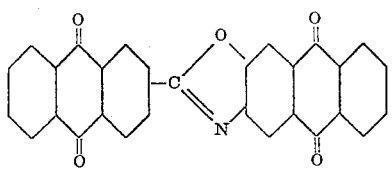

and 20 grams of formic acid of 10 percent strength.

Dry cotton fabric is entered at room temperature into the above dye liquor, then squeezed on a foulard until its increase in weight due to liquid is 68–80 percent, dried in the normal manner under tension (by means of clips or a pin frame), and finally hardened at 145–150° C. for 5 minutes.

The dyed goods are distinguished by their pleasant soft feel and withstand several washing treatments at the boil.

EXAMPLE 6

A dyebath is prepared which contains, per liter, 75 grams of the copolymer latex described in Example 1, 6 grams of an emulsion of 70 percent strength of a methylol-melamine allyl ether modified with soya bean fatty acid, with the use of Turkey red oil as emulsifying agent, 10 grams of dimethylol-urea, 20 grams of a micro-dispersed dyestuff paste of the green-dyeing dyestuff No. 1270 of Schultz' "Farbstofftabellen" (7th edition), 50 grams of sodium alginate 30:1000, and 5 grams of ammonium sulfate.

Dyeing is carried out as described in Example 5. The dyed material is especially fast to rubbing even in medium tints and has a full feel. Its fastness to washing is very good. The fabric has an improved resistance to scouring as compared with the untreated material.

EXAMPLE 7

A dyebath is prepared which contains, per liter, 40 grams of the non-neutralized copolymer emulsion described in Example 2, 4 grams of an emulsion of 70 percent strength of a methylol-melamine allyl ether modified with soya bean fatty acid, with the use of Turkey red oil as emulsifying agent, 8 grams of dimethylol-urea, 2 grams of an iron oxide pigment of 72 percent strength containing casein, 5 grams of ammonium sulfate and 2 grams of the sodium salt of a diisopropyl-naphthalene disulfonic acid.

This dyebath is especially suitable for dyeing fabrics of artificial filaments, such as nylon, "Orlon" or "Perlon" fabrics, pale to medium shades. During the dyeing operation the material also acquires a premanent dressing. The dyeing is distinguished by its very good fastness to washing and rubbing.

EXAMPLE 8

A dyebath is prepared which contains, per liter, 20 grams of the mixture of polymer latex and methylol-melamine butyl ether emulsion described in the first paragraph of Example 4, 2 grams of an emulsion of 70 percent strength of a methylol-melamine allyl ether modified with soya bean fatty acid, with the use of Turkey red oil as emulsifying agent, 80 grams of dimethylol-urea, 4 grams of a micro-dispersed paste of copper phthalocyanine and 5 grams of ammonium sulfate.

The above dyebath is suitable for dyeing laundry goods, which simultaneously acquire an anti-creasing finish.

EXAMPLE 9

A dyebath is prepared which contains, per liter, 40 grams of the non-neutralized copolymer latex described in Example 2, 6 grams of an emulsion of 70 percent strength of a methylol-melamine allyl ether modified with soya bean fatty acid, with the use of Turkey red oil as emulsifying agent, 10 grams of a water-soluble methyl ether of a urea-formaldehyde condensation product which contains more than 2 mols of condensed formaldehyde per mol of urea, 10 grams of a dyestuff paste of 2:7-dibromanthanthrone, 50 grams of sodium alginate 30:1000 and 15 grams of ammonium sulfate.

Dyeing is carried out as described in Example 5. The dyeing has a good fastness to washing and rubbing. The material also acquires a pleasant full feel.

EXAMPLE 10

Cotton poplin is dyed on a foulard in a bath which contains per liter, 10 grams of a micro-dispersed paste of copper phthalocyanine, 0.5 gram of sodium celluloseglycollate and 15 cc. of formic acid of 85 percent strength. After squeezing the material it is dried. The dyed fabric is then after-treated on a foulard in a bath which contains, per liter, 15 grams of the non-neutralized copolymer latex described in Example 3, 5 grams of an emulsion of 70 percent strength of a methylol-melamine allyl ether modified with soya bean fatty acid, with the use of Turkey red oil as emulsifying agent, 35 grams of a water-soluble methyl ether of a urea-formaldehyde condensation product which contains more than two mols of condensed formaldehyde per mol of urea, and 2 cc. of formic acid of 85 percent strength.

After being dried at 80° C. and hardened at 140° C. for 5 minutes, the material has the dyeing fixed thereon fast to washing. If the after-treatment of the dyeing is carried out without the addition of the emulsion of the methylol-melamine allyl ether, the fastness to washing of the dyeing is considerably weaker.

EXAMPLE 11

A dyebath is prepared which contains, per liter, 10 grams of a dyestuff paste containing 15 percent of copper phthalocyanine and [$\beta$-(octadecenoylamido)-ethyl]-diethyl-methyl-ammonium methosulfate as dispersing agent, 5 grams of an emulsion of 70 percent strength of a methylol-melamine allyl ether modified with soya bean fatty acid and containing about 10 percent of the aforesaid dispersing agent, 40 grams of a copolymer latex having a dry content of 40 percent prepared from 10 parts of the quaternary compound of acrylic acid (3-diethylaminopropyl)-amide and chloracetamide, 150 parts of isobutyl acrylate and 40 parts of acrylonitrile with the use of [$\gamma$-(laurylamido)-propyl]-diethylmethyl-ammonium methosulfate as emulsifier, 10 grams of a water-soluble methyl ether of a urea-formaldehyde condensation product containing more than 2 mols of condensed formaldehyde per mol of urea, 1 gram of [$\beta$-(octadecenoylamido)-ethyl]-diethylmethyl-ammonium methosulfate, and 4 grams of ammonium nitrate.

A cotton fabric in the dry state is entered at room temperature into the above dye liquor, then squeezed on a foulard until its increase in weight due to liquor is 65 to 80 percent, dried on a tensioning frame, and finally hardened for 5 minutes at 145–150° C.

A level dyeing is obtained having good fastness to migration, washing and rubbing.

EXAMPLE 12

(a) The procedure is the same as described in Example 11, except that there are used, per liter, 40 grams of a copolymer latex having a dry content of 40 percent and prepared from 90 parts of vinyl acetate and 10 parts of the quaternary compound of acrylic acid-(3-diethylaminopropyl)-amide with chloracetamide with the use of [$\gamma$-(laurylamido)-propyl]-trimethyl-ammonium methosulfate as emulsifier.

(b) The procedure is the same as described in Example 11, except that there are used 40 grams per liter of a copolymer latex having a dry content of 40 percent and prepared from 50 parts of vinyl acetate, 40 parts of n-butyl acrylate and 10 parts of the quaternary compound of acrylic acid-(3-diethylaminopropyl)-amide with chloracetamide and with the use of [$\gamma$-(stearylamido)-propyl] - dimethyl - ($\beta$ - hydroxyethyl) - ammonium phosphate as emulsifier.

(c) The procedure is the same as described in Example 11, except that there are used, per liter, 10 grams of the methylol-melamine allyl ether emulsion described in that example and 80 grams of the copolymer latex described under (b).

(d) The procedure is the same as described in Example 11, except that there are used, per liter, 10 grams of the methylol-melamine allyl ether emulsion described in that example and 40 grams of a copolymer latex having a dry content of 40 percent and prepared from 50 parts of n-butyl acrylate, 37.5 parts of vinyl acetate and 12.5 parts of the quaternary compound of acrylic acid-(3-diethylaminopropyl)-amide with chloracetamide and with the use of [γ-(stearylamido)-propyl]-dimethyl-(β-hydroxyethyl)-ammonium phosphate as emulsifier.

In all these methods level dyeings having good properties of fastness are obtained.

EXAMPLE 13

(a) *Single bath pigment dyeing over a white reserve*

A cotton fabric is printed with a white reserve paste containing, per kilogram 30 grams of titanium dioxide 1:1
18 grams of glue thickening 1:2
12 grams of sodium carbonate
10 grams of sodium formaldehyde-sulfoxylate
5 grams of polyvinyl-pyrrolidone
2 grams of ultramarine 1:100
18 grams of egg albumen 1:1, and
5 grams of water The printed and dried material is foularded at room temperature in a dye liquor containing, per liter, 6 grams of a micro-dispersed paste of copper phthalocyanine, 2 grams of a micro-dispersed paste of the violet-dyeing chlorinated iso-dibenzanthrone, 20 grams of the non-neutralized copolymer latex described in Example 2, 8 grams of an emulsion of 70 percent strength of a methylol-melamine allyl ether modified with soya bean fatty acid, with the use of Turkey red oil as emulsifying agent, 10 grams of a water-soluble methyl ether of a urea-formaldehyde condensation product which contains more than 2 mols of condensed formaldehyde per mol of urea, 10 grams of urea, 50 grams of sodium alginate 30:1000 and 5 grams of ammonium sulfate.

The material is foularded on a three-roller foulard until its increase in weight due to liquid is 80 percent, and the material is immediately dried at 75° C. and hardened at about 140° C. for about 2 minutes. It is then washed for 20 minutes on a reel at the boil with a synthetic detergent.

There is obtained a blue dyeing having a white reserve and good properties of fastness.

(b) *Single bath pigment dyeing over a colored reserve*

White, red, green and black reserves are printed on a cotton fabric. The white reserve is printed in the manner described under (a), and the colored reserves are all applied by the usual vat printing process. The dried fabric is then foularded in a dye liquor at room temperature which contains, per liter, 3 grams of a micro-dispersed paste of indanthrone, 1.7 grams of a micro-dispersed paste of copper phthalocyanine, 30 grams of the non-neutralized copolymer latex described in Example 2, 8 grams of an emulsion of 70 percent strength of a methylol-melamine allyl ether modified with soya bean fatty acid, with the use of Turkey red oil as emulsifying agent, 10 grams of a water-soluble methyl ether of a urea-formaldehyde condensation product containing more than 2 mols of formaldehyde per mol of urea, 10 grams of urea, 50 grams of sodium alginate 30:1000 and 5 grams of ammonium sulfate.

The fabric is foularded until its increase in weight due to liquor is 80 percent, and it is then dried at 75° C., hardened at 140° C. for 2 minutes and soaped at the boil.

There is obtained a good level dyeing, the colors are well reserved and the whole has a good fastness to washing.

(c) *2-bath pigment dyeing over a white reserve*

Cotton poplin is printed with a white reserve paste containing per liter, 300 grams of titanium dioxide
100 grams of talcum
200 grams of dextrin solution of 5 percent strength
30 grams of glycerine
85 grams of sodium alginate 40:1000
250 grams of a binding agent consisting of a copolymer latex having a dry content of about 50%
20 grams of urea
10 grams of ammonium thiocyanate solution of 50% strength
5 grams of turpentine oil 1000 grams After printing and drying the material it is dyed on a foulard in a bath containing, per liter, 10 grams of a microdispersed paste of copper phthalocyanine, 0.5 gram of sodium cellulose-glycollate, and 15 cc. of formic acid of 85 percent strength. After squeezing the fabric and drying it, the dyed fabric is after-treated in a bath containing, per liter, 30 grams of the copolymer latex described in Example 1, 5 grams of an emulsion of 70 percent strength of methylol-melamine allyl ether modified with soya bean fatty acid, with the use of Turkey red oil as emulsifying agent, 35 grams of a water-soluble methyl ether of a urea-formaldehyde condensation product containing more than 2 mols of formaldehyde per mole of urea and 5 grams of ammonium sulfate.

After being dried, the material is hardened for 5 minutes at 150° C., then soaped at the boil, rinsed and dried. There is obtained a blue dyeing having a white reserve and good properties of fastness.

EXAMPLE 14

A cotton fabric is printed with a printing paste containing, per kilogram, 60 grams of a red pigment dyestuff
9 grams of an emulsion of 36% strength of methylol-melamine butyl ether
5 grams of an emulsion of 70% strength of a methylol-melamine allyl ether modified with soya bean fatty acid, with the use of Turkey red oil as emulsifier
9 grams of a copolymer latex of 40 percent strength prepared from 55 parts of butadiene and 45 parts of acrylonitrile
14 grams of the non-neutralized copolymer latex described in Example 2
5 grams of a water-soluble methyl ether of a urea-formaldehyde condensation product containing more than 2 mols of condensed formaldehyde per mol of urea
4 grams of a mixture of 40 percent of potassium oleate and 60 percent of pine oil
30 grams of ammonium thiocyanate solution 1:1
864 grams of a petroleum emulsion as thickener 1000 grams The print is fixed and hardened in the usual manner. The print has a very good fastness to washing and rubbing, and no bleeding into the white ground takes place.

EXAMPLE 15

A dyebath is prepared containing, per liter, 7 grams of the dispersion of the red-dyeing vat dyestuff described in Example 5, 10 grams of the non-neutralized copolymer latex described in Example 2, 8 grams of an emulsion of 70 percent strength of a methylol-melamine allyl ether modified with soya bean fatty acid, with the use of Turkey red oil as emulsfier, 10 grams of a water-soluble methyl ether of a urea-formaldehyde condensation product containing more than two mols of condensed formaldehyde per mol of urea, 10 grams of urea and 5 grams of ammonium sulfate.

Dyeing is carried out as described in Example 5. The material is then printed in a roller printing machine with a vat dyestuff discharge paste containing, per kilogram, 200 grams of British gum,
200 grams of sodium hydroxide solution of 36° Bé.,
50 grams of zinc oxide,
150 grams of water,
300 grams of sodium formaldehyde-sulfoxylate and
100 grams of dimethyl-phenyl-benzyl-ammonium disulfonic acid.

After drying the material it is steamed in the usual manner, stripped at the boil, rinsed, washed at the boil with a sulfonate detergent, rinsed and dried. There is obtained a dyeing which is fast to washing, and shows no bleeding in the discharge parts.

EXAMPLE 16

Instead of making separate additions of the components of the binding agent, there may be used dispersions containing a combination of part of the latex emulsion and of the condensing resin dispersion. Combined dispersions of this kind can be prepared as follows:

(1) There are mixed in a homogenizer 574 parts of a 50% aqueous dispersion of a copolymer obtained from 85.8 parts of isobutyl acrylate, 9.6 parts of acrylonitrile, and 4.6 parts of acrylic acid; 10 parts of triethanolamine, 41.7 parts of water; 80 parts of Turkey red oil; and 287 parts of hexamethylolmelamine allyl ether.

The mixture must have a pH of 7.5–8. The dry content of the emulsion is 67%.

(2) 592 parts of a 50% aqueous dipsersion of a copolymer obtained from 85.8 parts of isobutyl acrylate, 9.6 parts of acrylonitrile, and 4.6 parts of acrylic acid are neutralized with 17.8 parts of triethanolamine and mixed in a homogenizer with 41.3 parts of Turkey red oil, 61.3 parts of water, and then with a solution of 29.6 parts of a hexamethylol melamine methyl ether esterified with about 2 mols of stearic acid, and 118.4 parts of methylol melamine butyl ether in 100 parts of ethylene chloride.

The syrupy emulsion with a dry content of 50% should have a pH of 7.5.

(3)(a) A mixture of 566 parts of the emulsion of copolymers mentioned under (1) are neutralized with 17 parts of triethanolamine and carefully mixed in a homogenizer with a mixture of 80 parts of Turkey red oil, 43.8 parts of water, and 293.2 parts of an n-butyl ether of hexamethylol melamine of 96.5% strength to obtain an emulsion of fine particles. This emulsion has a dry content of 66% and a pH of 7.9.

The following mixtures are made in the manner described under (3)(a):

(b)

566 parts of the emulsion of copolymers mentioned under (1)
16.8 parts of triethanolamine
80 parts of Turkey red oil
41.7 parts of water
305.5 parts of n-propyl ether of hexamethylol melamine (content, 91%)

1000 parts (c)

574 parts of the emulsion of copolymers mentioned under (1)
17.3 parts of triethanolamine
80 parts of Turkey red oil
41.7 parts of water
287 parts of n-propyl ether of hexamethylol melamine (100%) esterified with soya bean fatty acid 1000 parts (d)

574 parts of the emulsion of copolymers mentioned under (1)
17.3 parts of triethanolamine
80 parts of Turkey red oil
41.7 parts of water
287 parts of n-butyl ether of hexamethylol melamine (100%) esterified with soya bean fatty acid 1000 parts (e)

520 parts of the emulsion of copolymers mentioned under (1)
16 parts of triethanolamine
80 parts of Turkey red oil
42 parts of water
342 parts of isopropyl ether of hexamethylol melamine of 76% strength A dyebath containing the above combination is prepared so as to contain per liter 20 grams of the non-neutralized copolymer latex described in Example 3,
20 grams of one of the dispersions described under (1)–(3)(c), above,
10 grams of a water-soluble methyl ether of a urea-formaldehyde condensation product which contains more than 2 mols of formaldehyde per mol of urea,
10 grams of a dyestuff paste of 2,7-dibromanthanthrone,
50 grams of sodium alginate 30:1000,
15 grams of ammonium sulfate.

Instead of the water-soluble binding agent just mentioned, the same quantity of a known water-soluble formaldehyde condensation product of melamine, acetoguanamine, dicyandiamide, or acetylene-diurea can be used.

Dyeing and hardening are carried out as described in Example 5.

EXAMPLE 17

A finishing bath is prepared which contains per liter 40 grams of a copolymer latex having a dry content of 40% and obtained from 50 parts of n-butylacrylate, 37.5 parts of vinylacetate, and 12.5 parts of the quaternary compound obtained from acylic acid-(3-diethyl-aminopropyl)-amide and chloracetamide with [γ-(stearoylamido)-propyl] - dimethyl-(β - hydroxyethyl)-ammonium phosphate as emulsifier.
10 grams of a 70% emulsion of a methylolmelamine allyl ether modified with soya bean fatty acid, and emulsified with about 10% of [β-(octadecenoyl-amino)-ethyl]-diethylmethylammonium-methosulfate,
100 grams of dimethylol urea,
10 grams of the condensation product from 1 mol of stearic acid methylol amide and triethanolamine in the form of the acetate,
4 grams of ammonium acetate.

A cotton or linen fabric is treated in a foulard, squeezed as thoroughly as possible, dried as usual, and subjected to hardening for 5 minutes at 140–150° C.

In this manner a crease-resistant dressing can be produced which at the same time has a good fastness to scouring which resists washing.

The relative proportions given in the preceding examples for dyeings, may be varied. On the one hand, they depend on the color intensity, i.e. the quantity of dyestuff to be fixed and, on the other hand, on the kind of fabric treated. For pale tints and light fabrics relatively small quantities of the binding agents suffice (10–30 grams per liter of each binder), but for darker shades and heavy fabrics, such as tilts, auto upholstery or carpet material, larger quantities (about 20–60 grams of each binder) are advantageously used. The quantities to be used also depend on the type of fabric, that is to say, whether the fibers are of animal origin, such as wool or silk, or of vegetable origin such as cotton, on staple fibers of regenerated cellulose, or whether they are artificial fibers, or mixed.

EXAMPLE 18

Instead of making separate additions of the components of the binding agents, there may be used a concentrated aqueous composition of matter containing the components (a), (b) and (c). It is also possible to prepare compositions which contain also a pigment in dispersed form. Combined dispersions of this kind can be prepared as follows:

(1) There are mixed in a homogenizer 314.8 parts of a 50% aqueous dispersion of a copolymer obtained from 85.8 parts of isobutyl acrylate, 9.6 parts of acrylonitrile and 4.6 parts of acrylic acid; 9.5 parts of triethanolamine, 8.3 parts of water; 16.0 parts of Turkey red oil; 57.4 parts of a methylol melamine allyl ether modified with soya bean fatty acid; and 100 parts of a water-soluble methyl ether of a urea-formaldehyde condensation product containing more than two mols of condensed formaldehyde per mole of urea.

The mixture must have a pH of 7.5–8.

A dyebath containing the above composition of matter is prepared so as to contain per liter 50 grams of the above composition of binders
10 grams of a dyestuff paste of 1,7-dibromanthanthrone
50 grams of sodium alignate 30:1000
15 grams of ammonium sulfate Dyeing and hardening are carried out as described in Example 5.

(2) 320 parts of a 50% aqueous dispersion of a copolymer obtained from 85.8 parts of isobutylacrylate, 9.6 parts of acrylonitrile, and 4.6 parts of acrylic acid are mixed in a homogenizer with 8 parts of the condensation product from 1 mol of oleylalcohol and 120 mols of ethylene oxide, 48 parts of water, 30 parts of a water soluble trimethylolmelamine trimethyl ether, and then with a solution of 16 parts of a hexamethylol melamine hexamethylether esterified with about 2 mols of stearic acid, and 54 parts of methylol melamine butyl ether in 21 parts of butanol and 113 parts of ethylene chloride.

The mixture should have a pH of 7.5–8.

In order to prepare an adhesive paste which can be used with advantage for flock printing on textile 60 parts of the above mixture are mixed with
2 parts of an antifoaming agent,
30 parts of alginate thickening 40:1000, and
4 parts of an aqueous solution of ammonium chloride of 25 percent strength are added.

A cotton fabric is coated with the resulting mixture, then it is flocked, dried and heated for 5 minutes at 120° C. There is obtained a flock print of good fastness properties.

What is claimed is:

1. A process for improving fibrous material, which comprises contacting the material with an aqueous composition of matter which consists essentially of the following components:

(a) a latex of a flexible elastic polymerization plastic which has been obtained by polymerization of ethylenically unsaturated compounds, (b) an aqueous dispersion of a water-insoluble derivative, which is soluble in organic solvents, of a condensation product of formaldehyde with an aminotriazine-compound, and (c) a member selected from the group consisting of water-soluble condensation products of formaldehyde with an aminotriazine-compound, water-soluble condensation products of formaldehyde with an urea-compound and water-soluble ethers of such condensation products; drying the material and heating to harden the composition applied; the components being used in the following proportions, the parts being by weight calculated on the dry-content of the components: per 100 parts of component (a) about 10 to 180 parts of component (b) and about 20 to 1500 parts of component (c).

2. A process according to claim 1, wherein the aqueous composition of matter has been prepared from component (c) and a mixture of components (a) and (b).

3. A process for improving fibrous material, which comprises contacting the material with an aqueous composition of matter which consists essentially of the following components:

(a) a latex of a flexible elastic polymerization plastic, which has been obtained by polymerization of ethylenically unsaturated compounds and which contains groups capable of causing cross-linking with components (b) and (c), (b) an aqueous dispersion of a water-insoluble derivative, which is soluble in organic solvents, of a condensation product of formaldehyde with an aminotriazine-compound, and (c) a member selected from the group consisting of water-soluble condensation products of formaldehyde with an aminotriazine-compound, water-soluble condensation products of formaldehyde with an urea-compound and water-soluble ethers of such condensation products; drying the material and heating to harden the composition applied; the components being used in the following proportions, the parts being by weight calculated on the dry-content of the components: per 100 parts of component (a) about 10 to 180 parts of component (b) and about 20 to 1500 parts of component (c).

4. A process for improving fibrous material, which comprises contacting the material with an aqueous composition of matter which consists essentially of the following components:

(a) a latex of a flexible elastic polymerization plastic, which consists substantially of derivatives of acrylic acid, (b) an aqueous dispersion of a water-insoluble ether of a methylol melamine which is soluble in organic solvents, and (c) a water-soluble ether of a urea-formaldehyde condensation product; drying the material and heating to harden the composition applied, the components being used in the following proportions, the parts being calculated on the dryweight of the components: per 100 parts of component (a) about 10 to 180 parts of component (b) and about 20 to 1500 parts of component (c).

5. A process according to claim 4, wherein the aqueous composition of matter has been prepared from component (c) and a mixture of components (a) and (b).

6. A process for improving fibrous material, which comprises contacting the material with an aqueous composition of matter which consists essentially of the following components:

(a) a latex of a copolymerization product from 85.8 parts of isobutylacrylate, 9.6 parts of acrylonitrile and 4.6 parts of acrylic acid, (b) an aqueous dispersion of methylol melamine butyl ether which is insoluble in water but soluble in organic solvents, and (c) trimethylol melamine trimethylether; drying the material and heating to harden the composition applied, the components being used in the following proportions, the parts being calculated on the dryweight of the components: per 100 parts of component (a) about 60 parts of component (b) and about 30 parts of component (c).

7. A process according to claim 6, wherein the aqueous composition of matter has been prepared from component (c) and a mixture of components (a) and (b).

8. A process for improving fibrous material, which comprises contacting the material with an aqueous composition of matter which consists essentially of the following components:

(a) a latex of a copolymerization product from 85.8 parts of isobutylacrylate, 9.6 parts of acrylonitrile and 4.6 parts of acrylic acid, (b) an aqueous dispersion of a methylol melamine allyl ether modified with soya bean fatty acid which is dispersed by means of Turkey red oil, and (c) a water soluble methyl ether of a urea formaldehyde condensation product containing per mol of urea more than 1 mol of formaldehyde; drying the material and heating to harden the composition applied, the components being used in the following proportions, the parts being calculated on the dryweight of the components: per 100 parts of component (a) about 175 parts of component (b) and about 830 parts of component (c).

9. A process according to claim 8, wherein the aqueous composition of matter has been prepared from component (c) and a mixture of components (a) and (b).

10. A process for improving fibrous material, which comprises contacting the material with an aqueous composition of matter which consists essentially of the following components:

(a) a latex of a copolymerization product from 50 parts n-butyl acrylate, 37.5 parts of vinylacetate and 12.5 parts of the quaternary condensation product from acrylic acid-(3-diethylamino propyl)-amide and chloracetamide dispersed with [γ-(stearoylamido)-propyl]-dimethyl-(β-hydroxyethyl)-ammonium phosphate, (b) an aqueous dispersion of a methylol melamine allyl ether modified with soya bean acid which is dispersed with [β-(octodecenoylamido)]-ethyl-diethyl-methyl ammonium metho-sulfate, and (c) dimethylol urea; drying the material and heating to harden the composition applied, the components being used in the following proportions, the parts being calculated on the dry-weight of the components: per 100 parts of component (a) about 40 parts of component (b) and about 625 parts of component (c).

11. A process for producing a flock print, which comprises contacting a cellulosic fabric with an aqueous composition of matter which consists essentially of the following components:

(a) a latex of a flexible elastic polymerization plastic which has been obtained by polymerization of ethylenically unsaturated compounds, (b) an aqueous dispersion of a water-insoluble derivative, which is soluble in organic solvents, of a condensation product of formaldehyde with an aminotriazine-compound and (c) a member selected from the group consisting of water-soluble condensation products of formaldehyde with an aminotriazine-compound, water-soluble condensation products of formaldehyde with an urea-compound and water-soluble ethers of such condensation products, applying flock to the coated fabric, drying the material and heating it to harden the composition applied; the components being used in the following proportions, the parts being by weight calculated on the dry-content of the components: per 100 parts of component (a) about 60 parts of component (b) and about 25 to 60 parts of component (c).

12. A process for producing a flock print, which comprises contacting a cellulosic fabric with an aqueous composition of matter which consists essentially of the following components:

(a) a latex of a copolymerization product from 85.8 parts of isobutylacrylate, 9.6 parts of acrylonitrile and 4.6 parts of acrylic acid, (b) an aqueous dispersion of methylol melamine butyl ether which is insoluble in water but soluble in organic solvents, (c) trimethylolmelamine trimethylether; applying flock to the coated fabric, drying the material and heating it to harden the composition applied, the components being used in the following proportions, the parts being calculated on the dryweight of the components: per 100 parts of component (a) about 60 parts of component (b) and about 30 parts of component (c).

13. A process for dyeing and printing fibrous material with pigments, which comprises contacting the material with an aqueous composition of matter which consists essentially of a dispersed pigment and the following compounds as pigment-binders:

(a) a latex of a flexible elastic polymerization plastic which has been obtained by polymerization of ethylenically unsaturated compounds, (b) an aqueous dispersion of a water-insoluble derivative, which is soluble in organic solvents, of a condensation product of formaldehyde with an aminotriazine-compound and (c) a member selected from the group consisting of water-soluble condensation products of formaldehyde with an aminotriazine-compound, water-soluble condensation products of formaldehyde with an urea-compound and water-soluble ethers of such condensation products; drying the material and heating to harden the composition applied; the components being used in the following proportions, the parts being by weight calculated on the dry-content of the components: per 100 parts of component (a) about 10 to 180 parts of component (b) and about 20 to 1500 parts of component (c).

14. A process for dyeing and printing fibrous material with pigments, which comprises contacting the material with an aqueous composition of matter which consists essentially of a dispersed pigment and the following compounds as pigment-binders:

(a) a latex of a flexible elastic polymerization plastic, which contains groups capable of causing cross-linking with compounds (b) and (c), and which consists substantially of derivatives of acrylic acid, (b) an aqueous dispersion of a water-insoluble ether of a methylol melamine which is soluble in organic solvents, and (c) a water-soluble ether of a urea-formaldehyde condensation product; drying the material and heating to harden the composition applied, the components being used in the following proportions, the parts being calculated on the dryweight of the components: per 100 parts of component (a) about 10 to 180 parts of component (b) and about 20 to 1500 parts of component (c).

15. A process for dyeing and printing fibrous material with pigments, which comprises contacting the material with an aqueous composition of matter which consists essentially of a dispersed pigment and the following compounds as pigment-binders:

(a) a latex of a copolymerization product from 85.8 parts of isobutylacrylate, 9.6 parts of acrylonitrile and 4.6 parts of acrylic acid, (b) an aqueous dispersion of a methylol melamine allyl ether modified with soya bean fatty acid which is dispersed by means of Turkey red oil, and (c) a water-soluble methyl ether of a urea formaldehyde condensation product containing per mol of urea more than 1 mol of formaldehyde; drying the material and heating to harden the composition applied, the components being used in the following proportions, the parts being calculated on the dryweight of the components: per 100 parts of component (a) about 175 parts of component (b) and about 830 parts of component (c).

16. A process for dyeing fibrous material with pigments which comprises dyeing the material with pigments and after-treating it with an aqueous composition of matter which consists essentially of the following compounds as pigment-binders:

(a) a latex of a flexible elastic polymerization plastic which has been obtained by polymerization of ethylenically unsaturated compounds, (b) an aqueous dispersion of a water-insoluble derivative, which is soluble in organic solvents, of a condensation product of formaldehyde with an aminotriazine-compound, and (c) a member selected from the group consisting of water-soluble condensation products of formaldehyde with an aminotriazine-compound, water-soluble condensation products of formaldehyde with an urea-compound and water-soluble ethers of such condensation products; drying the material and heating to harden the composition applied; the components being used in the following proportions, the parts being by weight calculated on the dry-content of the components: per 100 parts of component (a) about 10 to 180 parts of component (b) and about 20 to 1500 parts of component (c).

17. A concentrated aqueous composition of matter consisting essentially of (a) a latex of a flexible elastic polymerization plastic which has been obtained by polymerization of ethylenically unsaturated compounds and which contains groups capable of causing cross-linking with components (b) and (c), (b) an aqueous dispersion of a water-insoluble derivative, which is soluble in organic solvents, of a condensation product of formaldehyde with an aminotriazine-compound, and (c) a member selected from the group consisting of water-soluble condensation products of formaldehyde with an aminotriazine compound, water-soluble condensation products of formaldehyde with an urea-compound, and water-soluble ethers of such condensation products, the composition containing per 100 parts of component (a) about 35 to 50 parts of component (b) and about 15 to 65 parts of component (c), the parts being by weight calculated on the dry-content of the components.

18. A concentrated aqueous composition of matter consisting essentially of (a) a latex of a flexible elastic polymerization plastic which has been obtained by polymerization of ethylenically unsaturated compounds and which contains groups capable of causing cross-linking with components (b) and (c), and (b) an aqueous dispersion of a water-insoluble derivative, which is soluble in organic solvents, of an aminotriazine-formaldehyde condensation product, and (c) a water-soluble ether of a condensation product of formaldehyde with an aminotriazine compound, the composition containing per 100 parts of component (a) about 35 to 50 parts of component (b) and about 15 to 65 parts of component (c), the parts being by weight calculated on the dry-content of the components.

19. A concentrated aqueous composition of matter consisting essentially of (a) a latex of a flexible elastic polymerization plastic, which contains groups capable of causing cross-linking with components (b) and (c) and which consists substantially of derivatives of acrylic acid, and (b) an aqueous dispersion of a water-insoluble ether of a methylol melamine which is soluble in organic solvents, and (c) a water-soluble methylolmelamine ether, the composition containing per 100 parts of component (a) about 35 to 50 parts of component (b) and about 15 to 65 parts of component (c), the parts being by weight calculated on the dry-content of the components.

20. A concentrated aqueous composition of matter consisting essentially of (a) a latex of a neutralized copolymerization product from 85.8 parts of isobutylacrylate, 9.6 parts of acrylonitrile and 4.6 parts of acrylic acid, and (b) an aqueous dispersion of methylolmelamine butyl ether which is insoluble in water but soluble in organic solvents, and (c) trimethylolmelaminetrimethyl ether, the composition containing per 100 parts of component (a) about 35 parts of component (b) and about 60 parts of component (c), the parts being by weight calculated on the dry-content of the components.

21. A concentrated aqueous composition of matter consisting essentially of (a) a latex of a neutralized copolymerization product from 85.8 parts of isobutylacrylate, 9.6 parts of acrylonitrile and 4.6 parts of acrylic acid, and (b) an aqueous dispersion of a methylol melamine allyl ether modified with soya bean fatty acid which is dispersed by means of Turkey red oil, and (c) a water soluble methyl ether of a urea formaldehyde condensation product containing per mol of urea more than 1 mol of condensed formaldehyde, the composition containing per 100 parts of component (a) about 35 parts of component (b) and about 60 parts of component (c), the parts being by weight calculated on the dry-content of the components.

References Cited in the file of this patent
UNITED STATES PATENTS

| | | |
|---|---|---|
| 2,311,850 | Mantell | Feb. 23, 1943 |
| 2,398,569 | Widmer | Apr. 16, 1946 |
| 2,454,078 | McGrew | Nov. 16, 1948 |
| 2,582,961 | Burnell et al. | Jan. 22, 1952 |
| 2,633,433 | Hollenberg | Mar. 31, 1953 |
| 2,709,693 | Widmer | May 31, 1955 |
| 2,749,257 | Knup et al. | June 5, 1956 |
| 2,755,198 | Stewart | July 17, 1956 |
| 2,759,900 | Caldwell et al. | Aug. 21, 1956 |
| 2,764,574 | Widmer et al. | Sept. 24, 1956 |
| 2,804,402 | Williams | Aug. 27, 1957 |
| 2,825,707 | Auer | Mar. 4, 1958 |